United States Patent [19]

Ono et al.

[11] Patent Number: 4,667,529

[45] Date of Patent: May 26, 1987

[54] STEERING WHEEL

[75] Inventors: Satoshi Ono; Tetsushi Hiramitsu; Atsuo Hirano, all of Aichi, Japan

[73] Assignee: Toyoda Gosei Co., Ltd., Nishikasugai, Japan

[21] Appl. No.: 767,834

[22] Filed: Aug. 20, 1985

[30] Foreign Application Priority Data

Aug. 21, 1984 [JP] Japan .................................. 59-173499

[51] Int. Cl.[4] ........................... B62D 1/10; B62D 1/16
[52] U.S. Cl. .................................... 74/492; 74/484 R;
74/552; 403/345
[58] Field of Search ...................... 74/492, 484 R, 552;
200/61.54; 403/345, 372, 380

[56] References Cited

U.S. PATENT DOCUMENTS

| | | | |
|---|---|---|---|
| 2,908,517 | 10/1959 | Peras | 403/372 X |
| 3,245,022 | 4/1966 | Goerg | 403/345 |
| 4,561,324 | 12/1985 | Hiramitsu et al. | 74/484 R X |
| 4,574,653 | 3/1986 | Hiramitsu et al. | 74/484 R |

FOREIGN PATENT DOCUMENTS

| | | |
|---|---|---|
| 3420358 | 1/1985 | Fed. Rep. of Germany . |
| 1044970 | 11/1953 | France . |
| 1571756 | 6/1969 | France . |
| 2539682 | 7/1984 | France . |
| 2541644 | 8/1984 | France . |
| 59-106346 | 6/1984 | Japan .................................. 74/484 R |
| 59-114143 | 7/1984 | Japan . |

*Primary Examiner*—Allan D. Herrmann
*Attorney, Agent, or Firm*—Cushman, Darby & Cushman

[57] ABSTRACT

A steering wheel comprises a rotatable steering shaft, a boss fixed onto the steering shaft, a pad non-rotatable mechanism mounted on the boss and used to hold pad means stationary, a support member for attaching the column-side non-rotatable member of the pad non-rotatable mechanism to the boss in such a manner that the column-side non-rotatable member is rotatable relative to the boss and stopper means provided on the column-side non-rotatable member and used to make the column-side non-rotatable member non-rotatable relative to a column.

1 Claim, 21 Drawing Figures

STEERING WHEEL

BACKGROUND OF THE INVENTION

1. Field of the Invention

This invention relates to a non-rotatable pad type steering wheel and more particularly to a structure for attaching a non-rotatable column-side member for setting pad means non-rotatable.

2. Description of the Prior Art

Heretofore, there have been used planet and sun gears as non-rotatable members for a non-rotatable pad type steering wheel. That is, as shown in FIG. 15, a column-side sun gear 80 is directly attached to a column 81, and a boss 83 and other parts including a pad-side sun gear 84, planet members whose planet gears 85 engaging with both sun gears 80, 84 are attached to both ends of a planet shaft 85a and a bearing member 87 pivotally supporting the parts above are combined with a boss 88 and a boss plate 89 at the end of a steering shaft 82 so as to make non-rotatable pad means 90 attached to the pad-side sun gear 84 relative to a column 1.

As shown in FIG. 16, pad means (not shown) is made non-rotatable using column-side and pad-side members 97, 98 having a pair of guide grooves 95, 96 put in phase and a pair of slide members 99 movable along both the guide grooves 95, 96 in the axial direction of a steering shaft.

In those non-rotatable pad type steering wheels, the steering shaft 82 has a tapered portion 82a, which is fitted in a tapered bore 83a of the boss 83.

Consequently, when the boss 83 fitted at the end of the steering shaft 82 is tightened and fixed by a nut 91, there is produced a taper sink between the tapered bore 83a of the boss 83 and the tapered portion 82a of the steering shaft 82. For that reason, the fitting position of the steering wheel is out of fix and moreover the spacing in the axial direction between the pad-side non-rotatable members 84, 98 and the column-side non-rotatable members 80, 97 cannot be kept constant.

In the non-rotatable pad type steering wheel using the planet gear mechanism shown in FIG. 15, because the column-side planet gear 80 as a column-side non-rotatable member is fixed to the column 81, the aforementioned taper sink is produced when the steering wheel is fixed to the steering shaft 82. As a result, there are caused variations of spacing in the axial direction between the pad-side sun gear 84 fixed to the steering wheel side and the column-side sun gear 80, so that both the sun gears 80, 84 are not allowed to accurately engage with the plurality of planet gears 85. The problem is that the pad means 90 will become unsteady when the steering wheel is rotated.

Even if guide members 97, 98 and slide members 99 are used as shown in FIG. 16, there will also be caused variation of the spacing in the axial direction between the column-side guide member 97 and the pad-side guide member 98 because of the taper sink. Accordingly, the slide member 99 is not allowed to smoothly slide along the guide grooves 95, 96, so that the pad means will also become unsteady when the steering wheel is rotated.

Moreover, because the column-side non-rotatable member (column-side sun gear 80 or column-side guide member 97) is handled separated from the other parts of the steering wheel when it is transported or assembled, it has disadvantages in that troublesome care and much time are needed in handling and assembling.

SUMMARY OF THE INVENTION

An object of the present invention is to provide a steering wheel without causing no variations in the fitting space between pad-side and column-side non-rotatable members despite a taper sink produced when a boss is fixed to a steering shaft nor unsteadiness of pad means.

In order to attain the aforesaid object, the steering wheel according to the present invention comprises a rotatable steering shaft, a boss fixed to the steering shaft, the non-rotatable mechanism of pad means for holding the pad means stationary, the mechanism being mounted on the boss, a supporting member for attaching the column-side non-rotatable member of the non-rotatable mechanism of the pad means to the boss in such a manner as to make both the member relative non-rotatable, and stopper means attached to the column-side non-rotatable member, the stopper means operating to make the member non-rotatable in relation to the column.

These and other objects of the invention may be readily ascertained by referring to the following description and claims. Many other advantages not referred herein will become mainfest to those versed in the art upon implementing the present invention.

BRIEF DESCRIPTION OF THE INVENTION

DETAILED DESCRIPTION OF THE PREFERRED EMBODIMENTS

Figure 1:
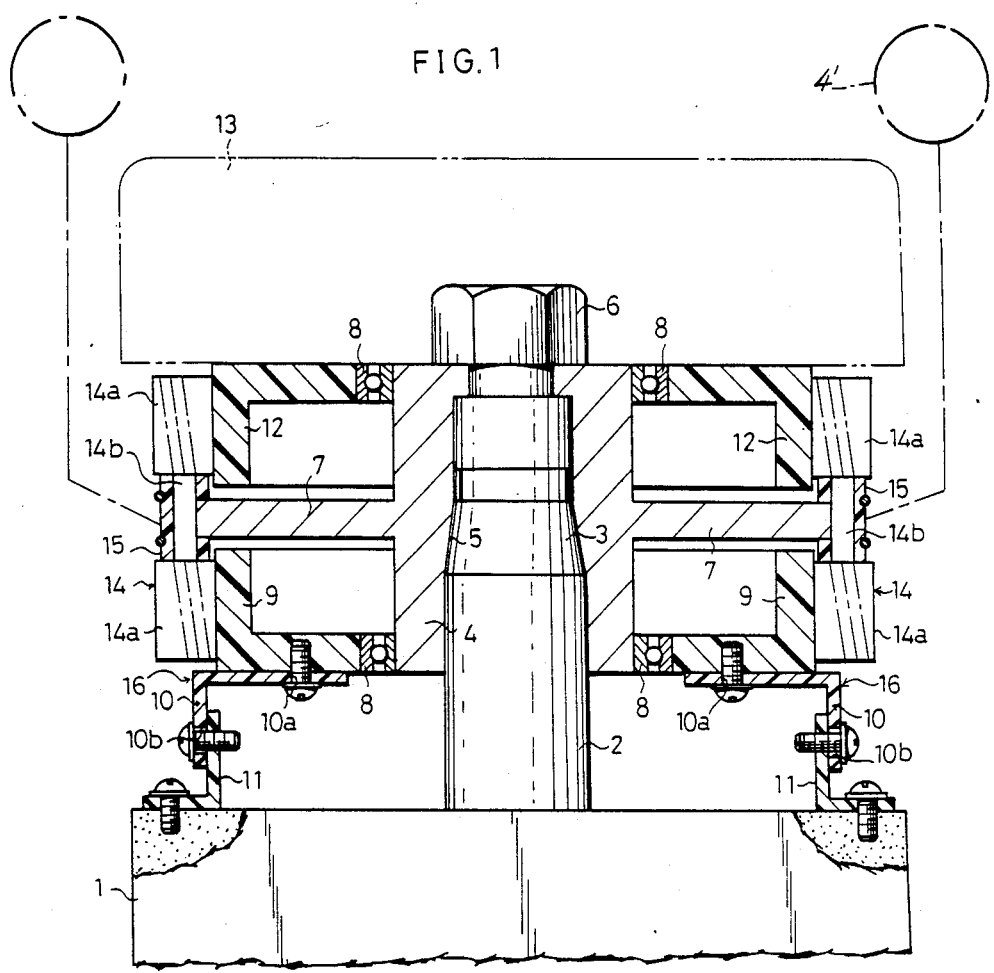
FIG. 1 is a cross sectional view illustrating a structure for attaching column-side sun gear in a first embodiment of the present invention.
Figure 2:
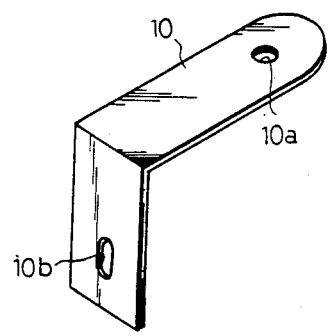
FIG. 2 is an enlarged perspective view of a hook member.

Referring now to FIGS. 1,2, a steering wheel embodying the present invention using a planet gear mechanism as a non-rotatable one will be described.

A column 1 is mounted on an automobile body and a rotatable steering shaft 2 is allowed to pass through the column 1 with a tapered portion 8 formed at one end. A boss 4 is attached to the front end of the steering shaft 2 and provided with a tapered bore 5 in the center thereof, the tapered portion 3 being inserted into the bore 5. The boss 4 is tightened and fixed by a nut 6. There is also provided a boss plate 7 provided in the boss 4.

Support members 8 are respectively attached to the outer peripheries of both ends of the boss 4 and a pair of bearings are used in this embodiment. A column-side sun gear 9 fitted onto one of the bearings 8 is made of synthetic resin.

As shown in FIG. 2, a pair of hook members 10 is L-shaped and composed of synthetic resin with a threaded bore 10a at one end and a long bore 10b for adjusting the screw fitting position in the axial direction at the other. Both hook members 10 are fixed to the column-side sun gear 9 by inserting screws in the bores 10a. The hook members 10 are coupled to a pair of coupling pieces 11 fixed to the column 1 by means of long bores 10b in such a manner that the spacing between the column 1 and the column-side sun gear 9 is adjustable. Accordingly, the column-side sun gear 9 is made non-rotatable against the column 1 by the stopper comprising the hook members 10 and the coupling pieces 11.

The pad-side sun gear 12 is rotatably attached to the boss 4 through the other bearing 8 and has the same diameter and the same number of teeth as those of the column-side sun gear 9. Pad means 13 is fixed to the pad-side sun gear 12 and equipped with electronic equipment such as switches, display units and sound generators.

The pair of planet members 14 mounted on the outer pheriphery of the boss plate 7 each comprise a pair of planet gears 14a respectively engaging with the column-side and pad-side sun gears 9, 12 and a planet shaft 14b equipped with the both the planet gears 14a on both sides. The planet gears 14a are supported by a bearing member 15 through the planet shaft 14b.

Accordingly, both the planet members 14 rotate while around the outer periphery of both the sun gears 9, 12 as the boss 4 rotates. The pad means 13 is kept at a standstill because the pad-side sun gear 12 rotates relatively to the boss 4.

In the steering wheel thus constructed, if steering ring means 4' fixed to the boss 4 is turned at the time of the operation of the steering, the boss 4 and the boss plate 7 will rotate therewith. Then the planet members 14 supported by the boss plate 7 will rotate while revolving around the outer peripheries of the column-side sun gear 9 and the pad-side sun gear 12. Moreover, although the column-side and pad-side sun gears 9, 12 mounted on the boss 4 through both the bearings 8 are rotatable relatively to the boss 4, the pad-side sun gear 12 relatively rotated by the planet members 14 is ultimately unable to rotate relatively to the column 1 because the column-side sun gear 9 is engaged with the column 1 in such a manner as being not allowed to rotate through the coupling pieces 11 and the hook members 10. Accordingly, the pad means 13 will not rotate relatively to the column 1.

Moreover, since the column-side and pad-side sun gears 9, 12 have been mounted on the boss 4 through the bearings 8, even if a taper sink is produced when the boss 4 is tightened and fixed to the steering shaft 2, no variations of the column-side and pad-side sun gears 9, 12 in the axial direction will not occur, so that it will not affect the engagement of the both the sun gears 9, 12 and the planet members 14 nor cause the unsteadiness of the pad means 13.

Moreover, because the column-side sun gear 9 is coupled to the column 1 through the long bores 10b of both the hook members 10 in such a manner that the position where the steering shaft 2 is attached in the axial direction is adjustable, the position for such attachment is minutely adjustable and a change in the distance between the column 1 and the pad means 13 due to the taper sink can be made absorbable.

(Second Embodiment)

Figure 3:
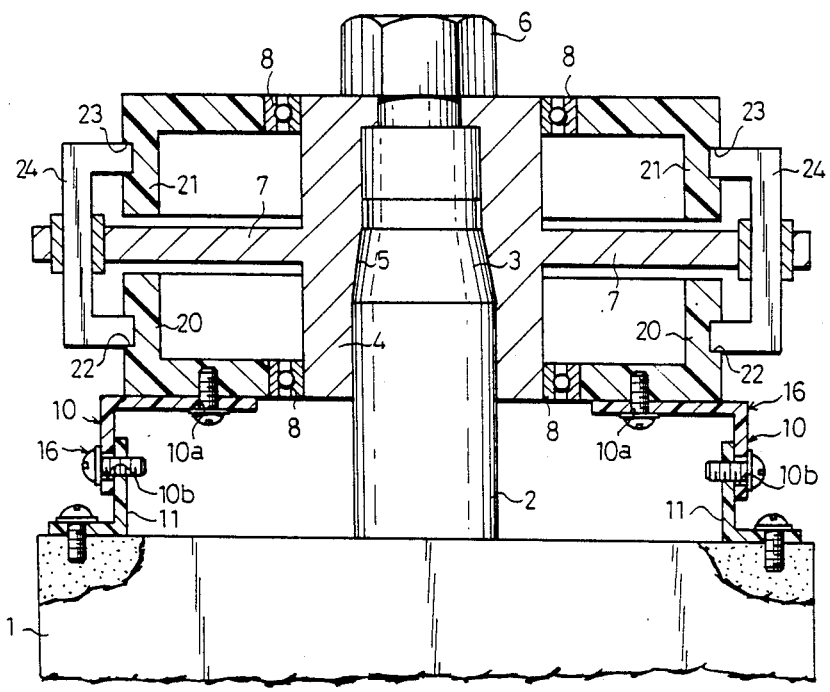
FIG. 3 is a cross sectional view illustrating a structure for attaching a column-side guide member in a second embodiment.

Subsequently referring to FIG. 3, the second embodiment of the present invention will be described.

The difference between the first and second embodiments lies in the fact that guide and slide members in place of both the sun gears 9, 12 and the planet members 14 of the first embodiment as pad non-rotatable mechanism are used.

In other words, a pair of cylindrical guide members 20, 21 are relatively rotatably mounted on the boss 4 through the bearings 8. On their outer peripheral faces are provided a pair of wavy guide grooves 22, 23 set in phase. The column-side guide member 20 is non-rotatably fixed to the column 1 by means of the hook members 10 and the coupling pieces 11.

A pair of slide members 24 is movably supported by the boss plate 7 in the axial direction of the steering shaft 2. The ends of both the slide members 24 are guided along the guide grooves 22, 23 and moved in the axial direction. As the slide members 24 are moved along the guide grooves 22, 23, the pad-side guide member 21 is non-rotatably checked against the column 1.

As set forth above, because the guide members 20, 21 are relatively rotatably mounted on the same boss 4 through the bearings 8 and the column-side guide member 20 is attached to the column 1 through the hook members 10 used to make adjustable the position where the guide member 20 is attached in the axial direction, the same effect as that in the first embodiment is possible Moreover, the use of the guide members 20, 21 and the slide members 24 make it possile to reduce the cost.

(Third Embodiment)

Figure 4:
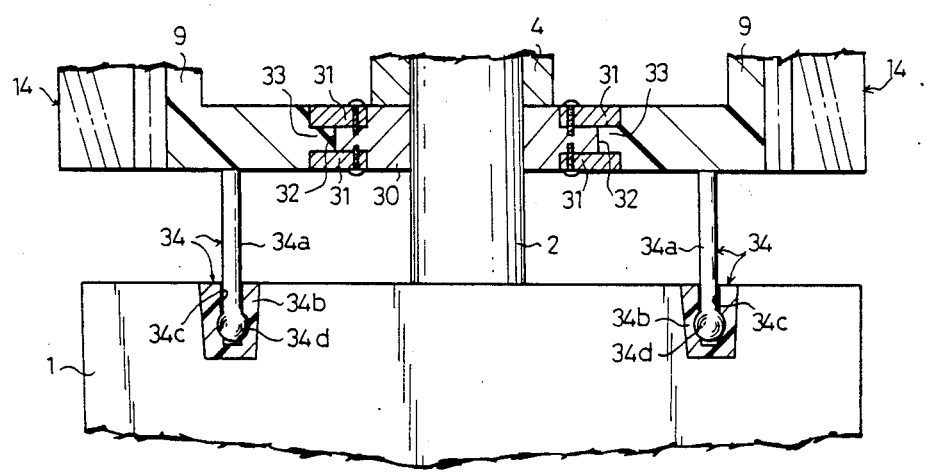
FIG. 4 is a cross sectional view illustrating a third embodiment.

Referring to FIG. 4, the thrid embodiment will be described.

This embodiment differs from the first embodiment in that a boss bottom, metal member 31 and a pair of stopper means having a hook pin and a pin receiver in place of the bearings 8 and the hook members 10 are used.

In other words, the boss bottom 30 fixed to the outer end of the boss 4 is provided with a projection on its outer periphery. A pair of metal members 31 are vertically mounted on the projection of the boss bottom 30 and they form a groove 32 in between them. A projected column 33 is formed on the inner periphery of the column-side sun gear 9 and slidably engaged with the groove 32.

Stopper means 34 for checking the column-side sun gear 9 and the column 1 is so arranged that the sphere 34d of the tip of a hook pin 34a pivotally attached to the column-side sun gear 9 can widen the pin receiver 34b buried in the column 1, the column being used to make the column 1 of the column-side sun gear 9 non-rotatable.

The pin receiver 34b having a pin receiving recess 34c is made of synthetic resin. The hook pin 34a forced in is capable of adjusting the fitting position in the axial direction within the recess 34c.

As set forth above, the boss bottom 30 and the metal members 31 are used as support members in the embodiment and the clolumn-side sun gear 9 is relatively rotatably mounted on the boss 4. As the column-side sun gear 9 is engaged with the column 1 through the stopper means 34 capable of adjusting the fitting position in the axial direction, the same effect as that in the first embodiment is made available.

The boss bottom 30 may not be provided separately from the boss 4 but incorporated in the lower portion of the boss 4.

(Another Example of the Third Embodiment)

Figure 5:
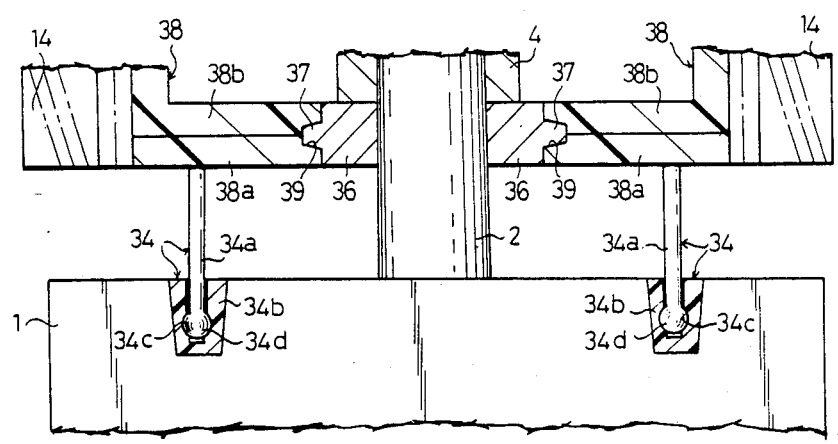
FIG. 5 is a cross sectional view illustrating another example of the third embodiment.

Referring to FIG. 5, an another example of the third embodiment will be described.

The difference between the first and this examples lies in the fact that a column-side sun gear 38 divided into upper and lower portions is used and the inner periphery of the column-side sun gear 38 and the outer pheriphery of the boss bottom are slidably clamped.

In other words, the boss bottom 36 is fixed to the lower end of the boss 4 and provided with a projection 37 on its outer periphery. The column-side sun gear 38 is allowed to slidably contact the boss bottom 36 and supplied with a groove 39 in its inner periphery. The column-side sun gear 38 is divided into upper 38b and lower 38a portions at the roughly central portion of the groove 39.

Furthermore, the same stopper means 34 as that in the third emodiment is provided for the lower portion 38a and the column 1 and the column-side sun gear 38 is engaged with the column 1 non-rotatably.

Accordingly, this embodiment has the same effect as that of the first embodiment.

Subsequently, another example of the stopper means for non-rotatably engaging the column-side sun gear with the column in the steering wheel using the planet gear mechanism as a pad non-rotatable member will be described.

Figure 6A:
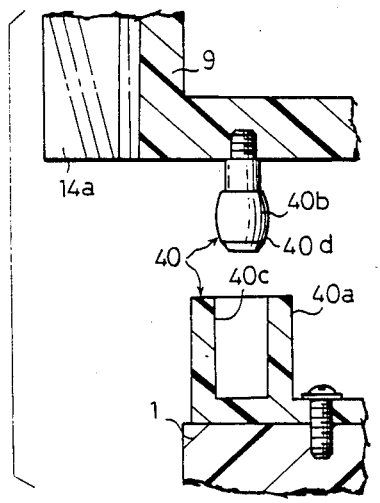
FIG. 6a is a cross sectional view illustrating stopper means using a pin receiver and a pin member

(1) As shown in FIG. 6a, the stopper means 40 comprises a pin receiver 40a having a pin receiving recess 40c made of elastic resin and a metal pin member 40b having an expanded diameter portion 40d with its end formed in the shape of a barrel.

The pin receiver 40a is pivotally attached to the upper end portion of the column 1. Moreover, the pin member 40b attached to the column-side sun gear 9 is forced in the recess 40c and its fitting position in the axial direction within the recess 40c is made adjustable and the column-side sun gear 9 is non-rotatably installed in the column 1.

Figure 6B:
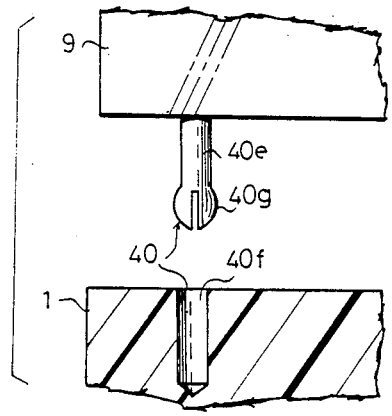
FIG. 6b is a cross sectional view illustrating stopper means using a recessed pin receiver and a pin member.

As shown in FIG. 6b, the stopper means 40 comprises a pin member 40e made of elastic synthetic resin and having an expanded diameter end portion 40g and a pin receiving recess 40f. The pin member 40e is incorporated with the column-side sun gear. The expanded diameter portion 40g at its end is provided with a slit so that the end portion may readily be transformed. By forcing the pin member 40e in the pin receiving recess 40f made in the column 1, the position of the pin member 40e is made adjustable within the recess 40f, whereas the column-side sun gear 9 is non-rotatably installed in the column 1.

Figure 7:
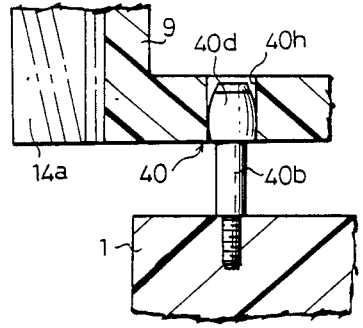
FIG. 7 is a cross sectional view illustrating stopper means using pin receiver bore and a pin member

(2) As shown in FIG. 7, the pin member 40b having the barrel-like expanded diameter portion 40d at its end is pivotally mounted on the column 1 and, by forming a pin receiving bore 40h in the column-side sun gear 9 and forcing the pin member 40b in the pin receiving bore 40h, the column-side sun gear 9 may be non-rotatably engaged with the column 1.

Figure 8:
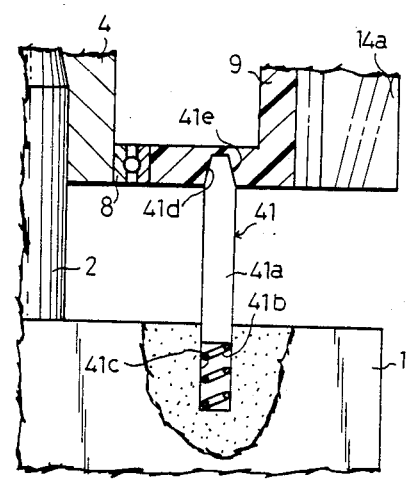
FIG. 8 is a cross sectional view illustrating stopper means using a recessed pin receiver and a pin member having an energizing member.

As shown in FIG. 8, the stopper means is formed with a pin member 41a having a tapered portion 41e at its end, a driving member 41b such as a coil spring, a recess 41c provided in the column 1 for housing both 41a, 41b and a pin receiving recess 41d provided in the column-side sun gear 9, whereby the column-side sun gear 9 may be engaged with the column 1 by making the pin member 41a protruding from the driving member 41b.

Figure 9A:
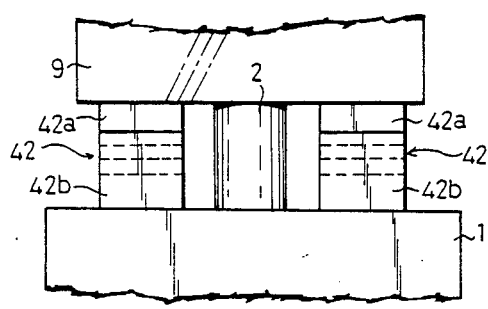
FIG. 9a is a front view of a stopper using a plurality of stopper plates.
Figure 9C:
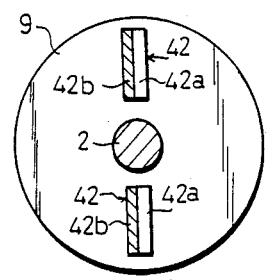
FIG. 9c is a top view of the same.
Figure 9B:
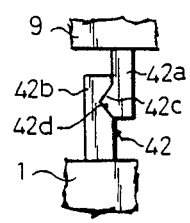
FIG. 9b is a side view of the same.

(3) As shown in FIGS. 9a, 9b, 9c, stopper means 42 comprises elastic resin-made hook plates 42a, 42b. The hook plate 42a is incorporated with the column-side sun gear 9 and has a boss 42c for engagement at its end. The hook plate 42b is projected from the column 1 and has a recess 42d engageable with the boss 42c at its end. The column-side sun gear 9 is engaged with the column 1 by allowing the boss 42c and the recess 42d of the hook plates 42a, 42b to engage with each other.

Figure 10A:
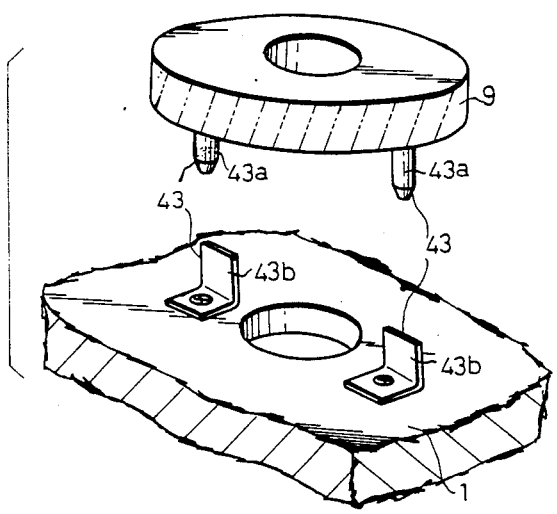
FIG. 10a is a perspective view of a stopper means comprising a pin member and a laminated spring.
Figure 10B:
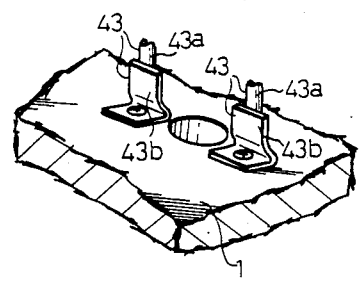
FIG. 10b is a perspective view illustrating the engaging position of the same.
Figure 10C:
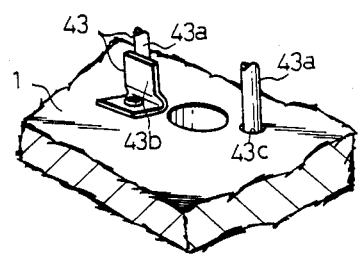
FIG. 10c is a perspective view illustrating another example of FIGS. 10a and 10b.

(4) As shown in FIGS. 10a, 10b, the stopper means 43 consists of a pin member 43a and a laminated spring 43b to make the pin member 43a contact the laminated spring 43b, so that the force of the spring 43b prevents the column-side sun gear 9 from rotating Moreover, the engaging structure may be provided on one side as shown in FIG. 10c, the other end being used to prevent the column-side sun gear 9 from rotating by means of the pin member 43a and the pin receiving bore 43c.

Figure 11:
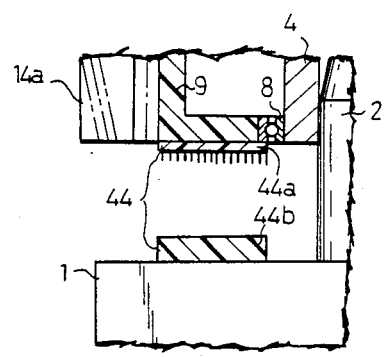
FIG. 11 is a cross sectional view of stopper means using a soft member and needles.

(5) As shown in FIG. 11, the stopper means 44 comprises a pair of soft members 44b and a number of needles 44a. These 44a, 44b are attached to the opposite faces of the column 1 and the column-side sun gear 9 and the column-side sun gear 9 is engaged with the column 1 by causing the needles 44a to penetrate into the soft members 44b.

Figure 12:
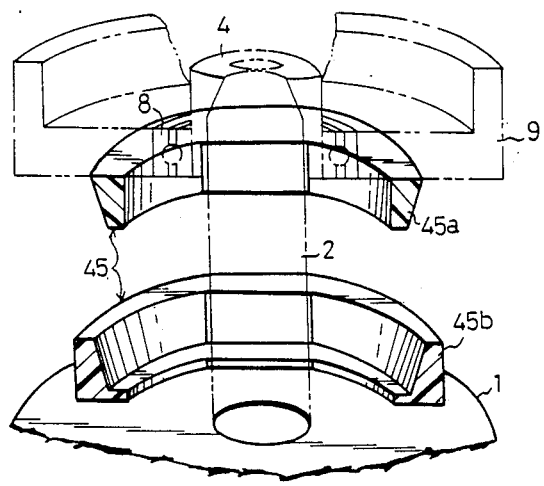
FIG. 12 is a perspective view illustrating stopper means using a pair of ring members engaging with each other.

(6) As shown in FIG. 12, the stopper means 45 consists of a pair of elastic frictional ring members 45a, 45b, which are attached to the opposite faces of the column 1 and the column-side sun gear 9 to make themselves engage with each other, whereby the friction force thereof allows the column-side sun gear 9 to engage with the column 1 non-rotatably.

Figure 13:
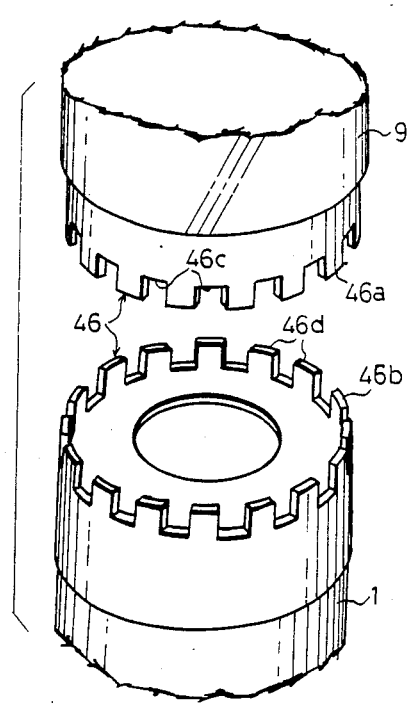
FIG. 13 is a perspective view illustrating stopper means using a number of ragged members engaging with each other.
Figure 15:
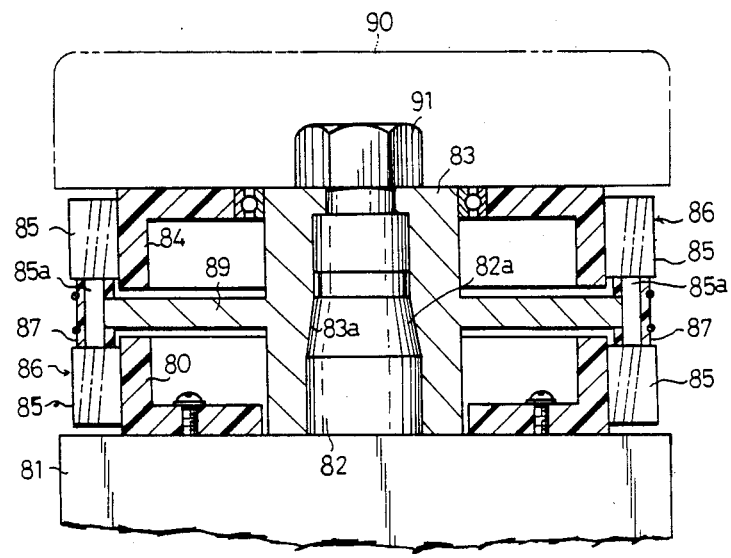
FIG. 15 is a cross sectional view illustrating a structure for attaching a conventional column-side non-rotatable member having a planet gear mechanism.
Figure 16:
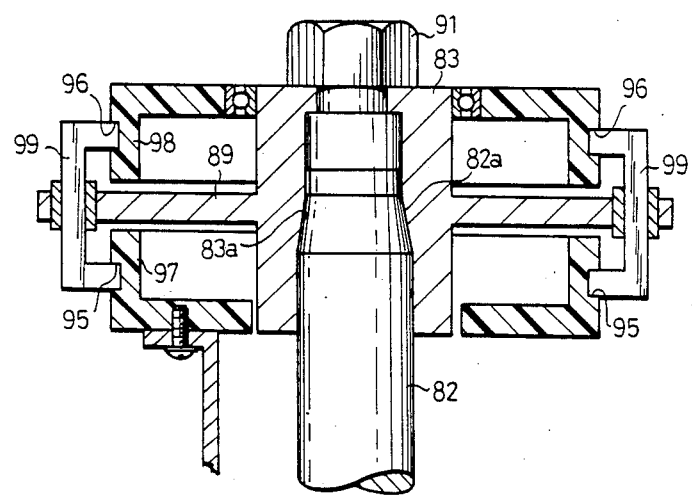
FIG. 16 is a cross sectional view illustrating a structure for attaching a conventional column-side non-rotatable member having a guide mechanism.

(7) As shown in FIG. 13, the stopper means 46 comprises engaging members 46a, 46b having boss and recess 46c, 46d whose cylindrical opposite ends engage with each other. The members 46a, 46b are attached to the opposite faces of the column 1 and the column-side sun gear 9 and made to engage with each other, whereby the column-side sun gear 9 is engaged with the column 1.

Figure 14:
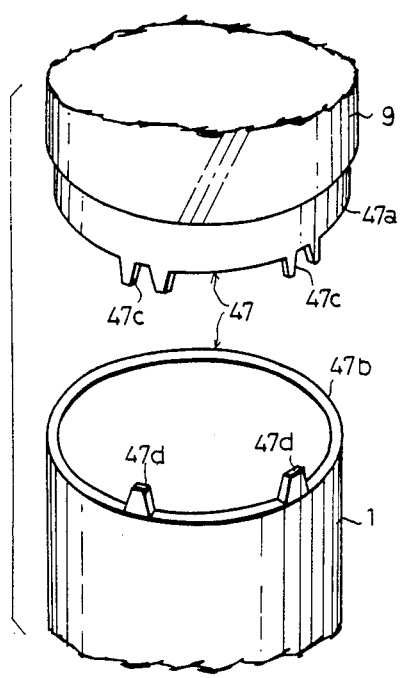
FIG. 14 is a perspective view illustrating stopper means using a pair of ragged members engaging with each other provided at predetermined intervals.

As another example of the embodiment of FIG. 13, it is also possible to arrange stopper means 47 shown in FIG. 14 by tapering a pair of opposite recess and boss 47c, 47d to be engaged with each other or forming recess and boss 47c, 47d to be engaged with each other at a predetermined space at the ends of the members 47a, 47b to be engaged together The engaging means provided at one place at least is sufficient to prevent the rotation.

As many apparently widely different embodiments of this invention may be made without departing from the spirit and scope thereof, it is to be understood that the invention is not limited to the specific embodiments thereof except as defined in the appended claim.

What is claimed is:
1. A steering wheel comprising:
   (a) a rotatable steering shaft;
   (b) a boss fixed onto said steering shaft;
   (c) a pad non-rotatable mechanism mounted on said boss and used to hold pad means stationary;
   (d) a support member for fixing a column-side non-rotatable member of said pad non-rotatable mechanism to said boss in such a manner as to make the former rotatable relative to the latter; and
   (e) stopper means provided on said column-side non-rotatable member, and used to make said member non-rotatable relative to a column, said stopper means comprising a pair of pin members with their base ends fixed to said column-side non-rotatable member and a pair of laminated springs attached to said column and engaged with the other ends of both said pin members.

* * * * *